(12) United States Patent
Bordeaux et al.

(10) Patent No.: US 10,814,585 B2
(45) Date of Patent: Oct. 27, 2020

(54) INORGANIC FIBER LAMINATE, VACUUM INSULATION MATERIAL USING SAME, AND MANUFACTURING METHOD FOR SAME

(71) Applicant: SAINT-GOBAIN ISOVER, Courbevoie (FR)

(72) Inventors: Frederic Bordeaux, Saint Germain en Laye (FR); Julien Thiery, Paris (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 0 days.

(21) Appl. No.: 16/330,907

(22) PCT Filed: Sep. 20, 2017

(86) PCT No.: PCT/IB2017/001149
§ 371 (c)(1),
(2) Date: Mar. 6, 2019

(87) PCT Pub. No.: WO2018/055447
PCT Pub. Date: Mar. 29, 2018

(65) Prior Publication Data
US 2019/0255804 A1     Aug. 22, 2019

(30) Foreign Application Priority Data

Sep. 20, 2016   (JP) .................................. 2016-183475

(51) Int. Cl.
*B23B 5/26* (2006.01)
*B32B 5/14* (2006.01)
(Continued)

(52) U.S. Cl.
CPC ............. *B32B 5/142* (2013.01); *B32B 5/022* (2013.01); *B32B 5/26* (2013.01); *B32B 37/18* (2013.01);
(Continued)

(58) Field of Classification Search
CPC . Y10T 428/16; Y10T 428/18; Y10T 428/231; Y10T 428/24992; Y10T 428/237; Y10T 428/238; B32B 5/26; B32B 2250/20
See application file for complete search history.

(56) References Cited

U.S. PATENT DOCUMENTS 4,917,750 A    4/1990 Klose
4,950,355 A    8/1990 Klose
(Continued)

FOREIGN PATENT DOCUMENTS

EP       0 277 500 A2    8/1988
WO    WO 97/36034 A1   10/1997

OTHER PUBLICATIONS

International Search Report dated Jan. 26, 2018 in PCT/IB2017/001149 filed on Sep. 20, 2017.

*Primary Examiner* — Alexander S Thomas
(74) *Attorney, Agent, or Firm* — Oblon, McClelland, Maier & Neustadt, L.L.P.

(57) ABSTRACT

The purpose of the present invention is to provide an inorganic fiber laminate having improved uniformity of surface density, as well as provide a vacuum insulation material using the same, and a manufacturing method for the same. The present invention relates to an inorganic fiber laminate (10) at least including a first inorganic fiber mat (1) that has a high-surface-density section (1a) and a low-surface-density section (1b), and a second inorganic fiber mat (2) that has a high-surface-density section (2a) and a low-surface-density section (2a), wherein the high-surface-density section (1a, 2a) of the first inorganic fiber mat (1) and/or the second inorganic fiber mat (2) are/is laminated on the low-surface-density section (1b) of the first inorganic fiber mat (1), and the high-surface-density section (1a, 2a) of the first inorganic fiber mat (1) and/or the second inor-
(Continued)

ganic fiber mat are/is laminated on the low-surface-density section (2b) of the second inorganic fiber mat (2).

20 Claims, 7 Drawing Sheets

(51) Int. Cl.
| | |
|---|---|
| *B32B 5/02* | (2006.01) |
| *B32B 5/26* | (2006.01) |
| *B32B 37/18* | (2006.01) |
| *D04H 1/4218* | (2012.01) |
| *D04H 1/72* | (2012.01) |
| *D04H 3/004* | (2012.01) |
| *D04H 1/4209* | (2012.01) |
| *D04H 1/70* | (2012.01) |
| *D04H 3/002* | (2012.01) |

(52) U.S. Cl.
CPC ......... *D04H 1/4209* (2013.01); *D04H 1/4218* (2013.01); *D04H 1/70* (2013.01); *D04H 1/72* (2013.01); *D04H 3/002* (2013.01); *D04H 3/004* (2013.01); *B32B 2262/101* (2013.01); *B32B 2307/304* (2013.01); *D10B 2101/06* (2013.01); *D10B 2401/04* (2013.01); *Y10T 428/16* (2015.01); *Y10T 428/18* (2015.01); *Y10T 428/231* (2015.01); *Y10T 428/237* (2015.01); *Y10T 428/238* (2015.01); *Y10T 428/24992* (2015.01)

(56) References Cited

U.S. PATENT DOCUMENTS

| | | |
|---|---|---|
| 5,065,478 A | 11/1991 | Furtak et al. |
| 5,268,015 A | 12/1993 | Furtak et al. |
| 6,298,529 B1 | 10/2001 | Aube et al. |

INORGANIC FIBER LAMINATE, VACUUM INSULATION MATERIAL USING SAME, AND MANUFACTURING METHOD FOR SAME

TECHNICAL FIELD

The present invention relates to a mineral fiber laminate, a vacuum thermal insulation material using that mineral fiber laminate, and a method for producing that mineral fiber laminate.

BACKGROUND ART

As described in Patent Document 1, a known method for producing mineral fibers consists of blowing off an inorganic material melted at a high temperature from a spinner using centrifugal force or the like to form the inorganic material into flocculent fibers.

Vacuum thermal insulation materials, obtained by using mineral fibers as a core material and sealing the core material in an envelope, have recently come to be used in numerous applications. Patent Document 2 discloses a mineral fiber laminate for a core material of a vacuum thermal insulation material obtained by laminating a plurality of layers of mineral fibers in the form of mats.

In addition, Patent Document 3 discloses a method for producing such mineral fibers for a core material of a vacuum thermal insulation material.

All of these documents are incorporated in the present specification by reference.

PRIOR ART DOCUMENTS

Patent Documents

[Patent Document 1] Japanese Unexamined Patent Publication No. 2009-155172
[Patent Document 2] Japanese Unexamined Patent Publication No. 2004-251460
[Patent Document 3] Japanese Unexamined Patent Publication No. 2006-342839

DISCLOSURE OF THE INVENTION

Problems to be Solved by the Invention

Although mineral fiber thermal insulation materials used in residential applications and the like consist of mineral fibers bonded with a binder resin, there are cases in which a binder resin is not used in mineral fibers used for the core materials of vacuum thermal insulation materials as described in Patent Document 3.

With respect thereto, the inventors of the present invention found that, in the case of mineral fibers, in particular mineral fibers not containing a binder, such as mineral fibers used for the core materials of vacuum thermal insulation materials, even though the thickness may be constant, there are cases in which the area density thereof is not uniform, thereby resulting in deterioration of insulating properties at those locations where area density is low.

Therefore, an object of the present invention is to provide a mineral fiber laminate having improved area density uniformity, a vacuum thermal insulation material that uses that mineral fiber laminate, and a method for producing that mineral fiber laminate.

Means for Solving the Problems

The inventors of the present invention found that the aforementioned problems can be solved by the present invention having the aspects indicated below.

<Aspect 1>

A mineral fiber laminate for a core material of a vacuum thermal insulation material, at least comprising: a first mineral fiber mat having a high area density portion and a low area density portion, and a second mineral fiber mat having a high area density portion and a low area density portion; wherein, the high area density portion of the first mineral fiber mat and/or the second mineral fiber mat is laminated on the low area density portion of the first mineral fiber mat, and the high area density portion of the first mineral fiber mat and/or the second mineral fiber mat is laminated on the low area density portion of the second mineral fiber mat.

<Aspect 2>

The mineral fiber laminate according to Aspect 1, wherein the high area density portion and the low area density portion of the first mineral fiber mat form mutually adjacent band-shaped regions across the length thereof, and the high area density portion and the low area density portion of the second mineral fiber mat form mutually adjacent band-shaped regions across the length thereof.

<Aspect 3>

The mineral fiber laminate according to Aspect 2, wherein, in the first mineral fiber mat, the high area density portion is a central band-shaped region across the width thereof, and the low area density portions are band-shaped regions adjacent to both sides of the central band-shaped region, and in the second mineral fiber mat, the low area density portion is a central band-shaped region across the width thereof, and the high area density portions are band-shaped regions adjacent to both sides of the central band-shaped region.

<Aspect 4>

The mineral fiber laminate according to any one of Aspects 1 to 3, wherein the high area density portion and the low area density portion of the first mineral fiber mat are separated from each other, and/or the high area density portion and the low area density portion of the second mineral fiber mat are separated from each other.

<Aspect 5>

A vacuum thermal insulation material, comprising: the mineral fiber laminate according to any one of Aspects 1 to 4, and an envelope in which the mineral fiber laminate is sealed therein.

<Aspect 6>

A method for producing a mineral fiber laminate, comprising:

a step of preparing a first mineral fiber mat having a high area density portion and a low area density portion;

a step of preparing a second mineral fiber mat having a high area density portion and a low area density portion; and, a step of laminating the high area density portion of the first mineral fiber mat and/or the second mineral fiber mat on the low area density portion of the first mineral fiber mat; and, laminating the high area density portion of the first mineral fiber mat and/or the second mineral fiber mat on the low area density portion of the second mineral fiber mat.

<Aspect 7>

The method according to Aspect 6, wherein the step of preparing the first mineral fiber mat and/or the step of preparing the second mineral fiber mat comprise(s) measuring the area density distribution of the mineral fiber mats.

<Aspect 8>

The method according to Aspect 6, wherein the step of preparing the first mineral fiber mat and/or the step of preparing the second mineral fiber mat comprise(s):

measuring the area density distribution of the mineral fiber mat web; and, obtaining a first mineral fiber mat having a high area density portion and a low area density portion and obtaining a second mineral fiber mat having a high area density portion and a low area density portion by cutting the mineral fiber mat web.

<Aspect 9>

The method according to Aspect 6, wherein the step of preparing the first mineral fiber mat and/or the step of preparing the second mineral fiber mat comprise(s):

forming a mineral fiber mat web by imparting a high area density portion and a low area density portion; and, imparting a first mineral fiber having a high area density portion and a low area density portion and imparting a second mineral fiber mat having a high area density portion and low area density portion by cutting the mineral fiber mat web.

<Aspect 10>

The method according to Aspect 8 or 9, further comprising:

separating the high area density portion and the low area density portion of the first mineral fiber mat by cutting the first mineral fiber mat; and, separating the high area density portion and the low area density portion of the second mineral fiber mat by cutting the second mineral fiber mat.

Effects of the Invention

According to the present invention, a mineral fiber laminate having improved area density uniformity, a vacuum thermal insulation material that uses that mineral fiber laminate, and a method for producing that mineral fiber laminate are provided.

MODE FOR CARRYING OUT THE INVENTION

<Mineral Fiber Laminate>

Figure 1:
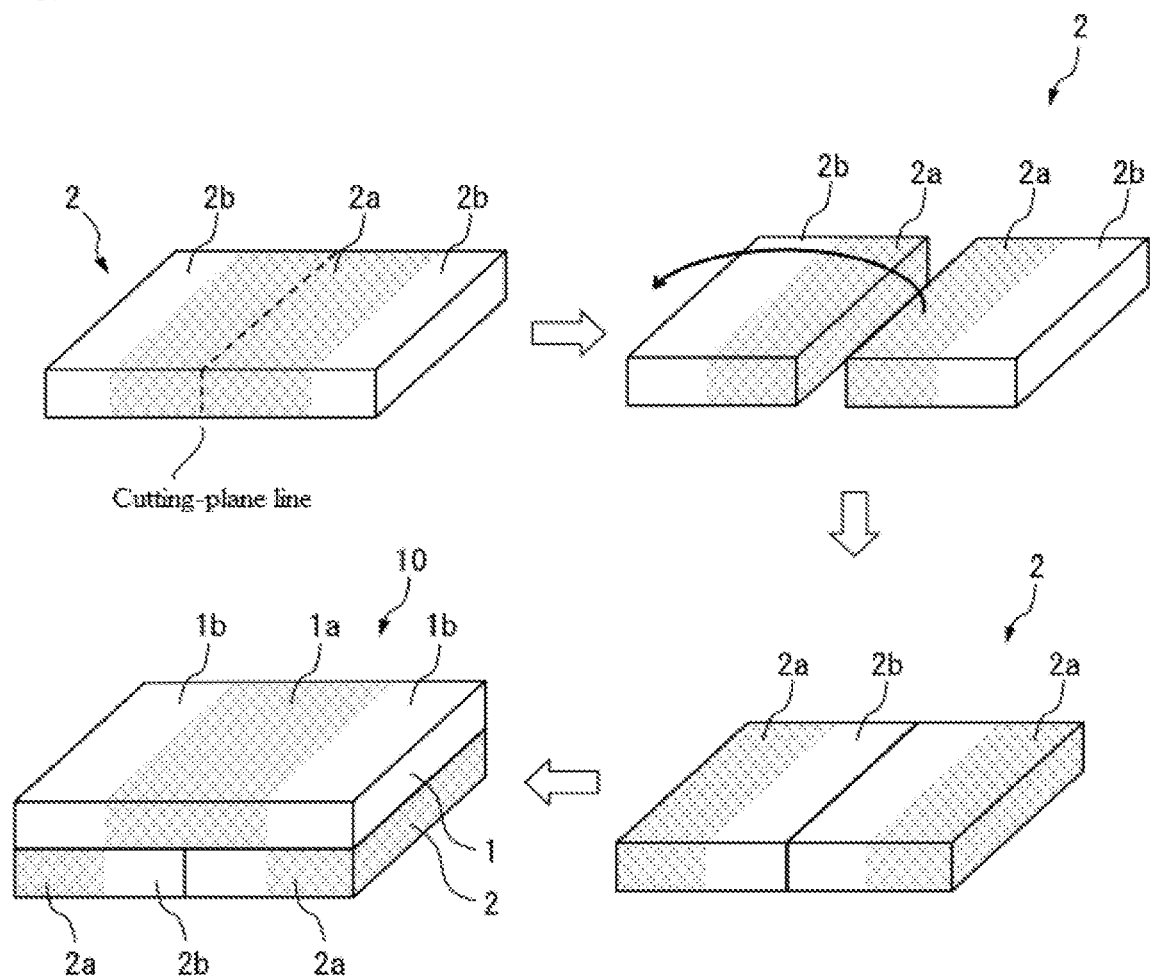
FIG. 1 shows one aspect in the case of producing the mineral fiber laminate of the present invention using two mineral fiber mats having similar area density distributions.

The mineral fiber laminate of the present invention at least comprises a first mineral fiber mat having a high area density portion and a low area density portion, and a second mineral fiber mat having a high area density portion and a low area density portion. In this mineral fiber laminate, the high area density portion of the first mineral fiber mat and/or the second mineral fiber mat is laminated on the low area density portion of the first mineral fiber mat, and the high area density portion of the first mineral fiber mat and/or the second mineral fiber mat is laminated on the low area density portion of the second mineral fiber mat. The mineral fiber used in the mineral fiber laminate of the present invention is preferably a mineral fiber that does not contain a binder, such as a mineral fiber used in a core material of a vacuum thermal insulation material.

As a result of laminating the high area density portion of the first mineral fiber mat and/or the second mineral fiber mat on the low area density portion of the first mineral fiber mat and laminating the high area density portion of the first mineral fiber mat and/or the second mineral fiber mat on the low area density portion of the second mineral fiber mat, the laminate of the present invention has improved area density uniformity. This type of laminate is able to impart uniform insulating properties in the plane, and as a result is able to impart high insulating properties since the laminate has fewer portions forming thermal bridges within the plane thereof.

In the mineral fiber laminate of the present invention, a high area density portion of a second mineral fiber mat may be laminated on a low area density portion of a first mineral fiber mat, and a high area density portion of a first mineral fiber mat may be laminated on a low area density portion of a second mineral fiber mat. In addition, in the mineral fiber laminate of the present invention, a high area density portion of a first mineral fiber mat may be laminated on a low area density portion of a first mineral fiber mat, and a high density portion of a second mineral fiber mat may be laminated on a low area density portion of a second mineral fiber mat. Moreover, in the mineral fiber laminate of the present invention, a high area density portion of a first mineral fiber mat and a second mineral fiber mat may be laminated on a low area density portion of a first mineral fiber mat, and a high area density portion of a first mineral fiber mat and a second mineral fiber mat may be laminated on a low area density portion of a second mineral fiber mat.

Mineral fiber mats were conventionally produced so as to have a constant thickness, and area density was also thought to be constant in the planar direction as a result thereof. However, when the inventors of the present invention measured the area density of a mineral fiber mat having a constant thickness, area density was found to not be uniform. In addition, those locations where area density is low were determined to have poor insulating properties when using in a vacuum thermal insulation material. Therefore, the inventors of the present invention obtained the laminate of the present invention by superimposing mineral fiber mats so that area density was at least partially constant.

In the present specification, area density refers to the weight per unit area of the main face of a mineral fiber mat, and refers to a value calculated by cutting out a mineral fiber mat web into the shape of a rectangle at all thicknesses, such as by cutting out into a rectangular shape to an area of about 5 cm² or about 10 cm² at all thicknesses, and then measuring the weight thereof.

Here, a high area density portion refers to a portion having area density that is higher than the average area density of the entire mineral fiber mat, while a low area density portion refers to a portion having area density that is lower than the average area density of the entire mineral fiber mat. For example, a high area density portion may be a portion having area density that is 1% or more higher, 3% or more higher, 5% or more higher or 10% or more higher than the average area density of the entire mineral fiber mat, while a low area density portion may be a portion having area density that is 1% or more, 3% or more, 5% or more or 10% or more lower than the average area density of the entire mineral fiber mat.

In addition to having a high area density portion and a low area density portion, the mineral fiber mat may also have an intermediate area density portion having area density substantially equal to the average area density of the entire mineral fiber mat. This intermediate area density portion may be a portion having area density within the range of less than 1%, less than 3%, less than 5% or less than 10% from the average area density of the entire mineral fiber mat.

In addition, the high area density portion or low area density portion refers to a region accounting for an area of 1 cm² or more, 3 cm² or more, 5 cm² or more, 10 cm² or more, 20 cm² or more or 30 cm² or more, and 5000 cm² or less, 3000 cm² or less, 1000 cm² or less, 500 cm² or less or 100 cm² or less within the plane thereof.

The high area density portion and low area density portion of the mineral fiber mat may extend in a band shape over the length thereof, and for example, the high area density portion of the first mineral fiber mat may be present in a band-shaped region in the center of the width of the mat, and the low area density portions may be present on both sides of the central band-shaped region thereof. In this case, the second mineral fiber mat is such that the low area density portion is present in the band-shaped region in the center of the width of the mat and the high area density portions are present on both sides of the central band-shaped region thereof so as to compensate for deviations in the distribution of area density of the first mineral fiber mat. In this case, the second mineral fiber mat may be cut along the central band-shaped region.

A plurality of the high area density portion, the intermediate area density portion and the low area density portion of the mineral fiber mats used in the laminate of the present invention may each be present in the mineral fiber mats. In this case, although all deviations in area density of the first mineral fiber mat are preferably compensated by deviations in area density of the second mineral fiber mat, the low area density portion or high area density portion of the second mineral fiber mat may be laminated only on one of the plurality of high area density portions or low area density portions of the first mineral fiber mat.

An additional mineral fiber mat may be laminated in the laminate of the present invention in addition to the first mineral fiber mat and the second mineral fiber mat.

In this case, the mineral fiber mats are preferably laminated so as to minimize area density distribution throughout the entire laminate.

In addition, the high area density portion or low area density portion of the second mineral fiber mat may be laminated on the intermediate area density portion of the first mineral fiber mat.

Moreover, the high area density portion of the second mineral fiber mat may be laminated on the high area density portion of the first mineral fiber mat provided it is laminated over a comparatively small region within a range that allows the effects of the present invention to be obtained. In this case, a third mineral fiber mat or fourth mineral fiber mat or the like may be used to laminate a low area density portion of the third mineral fiber mat, etc., on the laminated portion of the high area density portion of the first mineral fiber mat and the high area density portion of the second mineral fiber mat.

Moreover, the low area density portion of the second mineral fiber mat may be laminated on the low area density portion of the first mineral fiber mat provided it is laminated over a comparatively small region within a range that allows the effects of the present invention to be obtained. In this case, a third mineral fiber mat or fourth mineral fiber mat or the like may be used to laminate a high area density portion of the third mineral fiber mat, etc., on the laminated portion of the low area density portion of the first mineral fiber mat and the low area density portion of the second mineral fiber mat.

The distribution of area density of the first mineral fiber mat and the second mineral fiber mat may be laminated so as to compensate for deviations in the distribution of area density thereof by respectively cutting the high area density portion, intermediate area density portion and/or low area density portion of the first mineral fiber mat and the second mineral fiber into individual portions. In addition, the first mineral fiber mat may also be cut into each area density portion so as to facilitate lamination of the high area density portion or low area density portion of the second mineral fiber mat. Thus, a high area density portion, an intermediate area density portion and/or a low area density portion of a first mineral fiber mat and/or second mineral fiber mat may be present while mutually separated. However, a high area density portion, intermediate area density portion and/or low area density portion of a first mineral fiber mat and/or second mineral fiber mat may also not be separated.

Although the area density of the laminate of the present invention is made to be comparatively uniform, a portion having a higher area density than the average area density of the entire laminate may be present, and that high area density portion may have area density that is 1% or more, 3% or more, 5% or more or 10% or more higher than the average area density of the entire laminate. In addition, a portion having area density lower than the average area density of the entire laminate may be present in the laminate of the present invention, and that low area density portion may have area density that is 1% or more, 3% or more, 5% or more or 10% or more lower than the average area density of the entire laminate.

The average area density of the entire laminate of the present invention may be, for example, 1000 g/m² or more, 1200 g/m² or more, 1500 g/m² or more, 1800 g/m² or more or 2000 g/m² or more, or may be 4000 g/m² or less, 3500 g/m² or less, 3000 g/m² or less or 2500 g/m² or less.

The density of the entire laminate of the present invention may be, for example, 50 kg/m³ or more, 80 kg/m³ or more, 100 kg/m³ or more or 150 kg/m³ or more, or may be 350 kg/m³ or less, 300 kg/m³ or less, 250 kg/m³ or less or 200 kg/m³ or less.

The laminate of the present invention may be such that the main face has a roughly rectangular shape. The length of one side of the main face may be, for example, 5 cm or more, 10 cm or more, 15 cm or more or 20 cm or more, or may be 100 cm or less, 80 cm or less, 60 cm or less, 40 cm or less, 30 cm or less or 25 cm or less. In addition, the thickness while in the state of being sealed in the envelope of a vacuum thermal insulation material may be 5 mm or more, 8 mm or more, 10 mm or more or 15 mm or more, or 50 mm or less, 40 mm or less, 30 mm or less or 20 mm or less.

An example of the mineral fibers used in the mineral fiber mats of the laminate of the present invention is glass wool fibers. The average fiber diameter of the mineral fibers may be, for example, 1 μm or more, 2 μm or more or 3 μm or more, or 20 μm or less, 10 μm or less, 8 μm or less or 5 μm or less. The mineral fiber mats may contain a binder such as phenol resin, for example, or may not substantially contain a binder. For example, the mineral fiber mats may employ a three-dimensional framework structure in which fiber intersecting portions are joined with water glass like that obtained according to the method described in Japanese Patent No. 3712129.

The first and second mineral fiber mats used in the laminate of the present invention may have a roughly cuboid shape having width, length and thickness, and the width and length may be 100 mm or more, 200 mm or more, 300 mm or more, 400 mm or more or 500 mm or more, and 2000 mm or less, 1500 mm or less, 1200 mm or less, 1000 mm or less, 800 mm or less, 600 mm or less, 500 mm or less, 400 mm or less or 300 mm or less. In addition, the thickness may be 10 mm or more, 30 mm or more, 50 mm or more, 100 mm or more, 150 mm or more, 200 mm or more or 300 mm or more, and 500 mm or less, 300 mm or less, 200 mm or less, 100 mm or less, 50 mm or less, 30 mm or less or 10 mm or less. The laminate of the present invention may also have a roughly cuboid shape having width, length and thickness, and dimensions equal to those of the aforementioned first and second mineral fiber mats can be selected for the dimensions thereof.

<Vacuum Thermal Insulation Material>

The vacuum thermal insulation material of the present invention comprises the aforementioned mineral fiber laminate and an envelope that seals the mineral fiber laminate therein. The envelope normally comprises a thermal-adhesion layer, a barrier layer and a protective layer, and a sealed portion is formed by mutually thermally fusing facing thermal-adhesion layers at end portions thereof to seal a core material therein. Each layer can be adhered together with an adhesive layer. In addition, an adsorbent or hygroscopic agent and the like can also be contained between and/or within each layer.

The thickness of the envelope may be 10 μm or more, 20 μm or more, 30 μm or more or 40 μm or more, or 100 μm or less, 80 μm or less or 60 μm or less.

The vacuum thermal insulation material of the present invention can be used for the purpose of thermal insulation in floor heating systems, vending machines, unit bathrooms, bathtubs and bathtub covers, thermos flasks, refrigerators, cold storage rooms, cold storage vehicles, cooler boxes, automobiles, building (residential) roofs, building walls, building ceilings, building floors and hot water tanks, etc.

<Method for Producing Mineral Fiber Laminate>

The method for producing the mineral fiber laminate of the present invention comprises: a step of preparing a first mineral fiber mat having a high area density portion and a low area density portion, a step of preparing a second mineral fiber mat having a high area density portion and a low area density portion, a step of laminating the high area density portion of the first mineral fiber mat and/or the second mineral fiber mat on the low area density portion of the first mineral fiber mat, and laminating the high area density portion of the first mineral fiber mat and/or the second mineral fiber mat on the low area density portion of the second mineral fiber mat. Here, lamination may be carried out online continuously or offline in batches.

The mineral fiber mats may be obtained by forming flocculent mineral fibers blown off from a spinner into mats while transporting on a conveyor. In the case that there are deviations in the location where mineral fibers are blown out from the spinner, high area density portions and low area density portions may occur in the form of bands across the length of the mineral fiber mats. For example, a high area density portion may be formed in the form of a band in the center across the width of a mineral fiber mat as a result of mineral fibers concentrating and accumulating in the central portion of the conveyor, or a low area density portion may be formed in the form of a band in the center of a mineral fiber mat as a result of mineral fibers concentrating and accumulating at the end of the conveyor.

Although mineral fiber mats were conventionally formed so as to have a constant thickness with respect to the transverse direction of the conveyor (across the width of a mineral fiber mat), when the inventors of the present invention measured the area density distribution of a continuously produced mineral fiber mat in the transverse direction over a long period of time, it was determined that locations where area density was higher and locations where area density was lower tended to be present across the width of the mat although these locations have same thickness. Therefore, the inventors of the present invention discovered the production method of the present invention that comprises laminating mineral fiber mats so as to compensate for deviations in the area density distribution thereof.

For example, as shown in FIG. 1, in a case where a second mineral fiber mat (2) has a high area density portion (2a) in a band-shaped region in the center across the width of the mat and has low area density portions (2b) on both sides of the central band-shaped region, the second mineral fiber mat (2) is cut at the high area density portion (2a), the second mineral fiber mat (2) is formed by rearranging the cut portions so that the band-shaped region in the center of the mat becomes the low area density portion (2b), and this is then laminated with a first mineral fiber mat (1), having a high area density portion (1a) in a band-shaped region in the center of the mat and low area density portions (1b) on both sides of the central band-shaped region, thereby enabling formation of the aforementioned laminate (10) of the present invention.

In a method for producing a mineral fiber laminate of a first embodiment of the present invention, the aforementioned step of preparing the first mineral fiber mat and/or step of preparing the second mineral fiber mat comprise(s) measuring the area density distribution of the mineral fiber mats.

In this method, the first mineral fiber mat and/or the second mineral fiber mat may be cut after having measured the area density distribution, followed by laminating the first mineral fiber mat and the second mineral fiber mat.

In addition, in a method for producing a mineral fiber laminate of a second embodiment of the present invention, the aforementioned step of preparing the first mineral fiber mat and/or step of preparing the second mineral fiber mat comprise(s): measuring the area density distribution of a mineral fiber mat web; and obtaining a first mineral fiber mat having a high area density portion and a low area density portion and obtaining a second mineral fiber mat having a high area density portion and a low area density portion by cutting the mineral fiber mat web.

Figure 2:
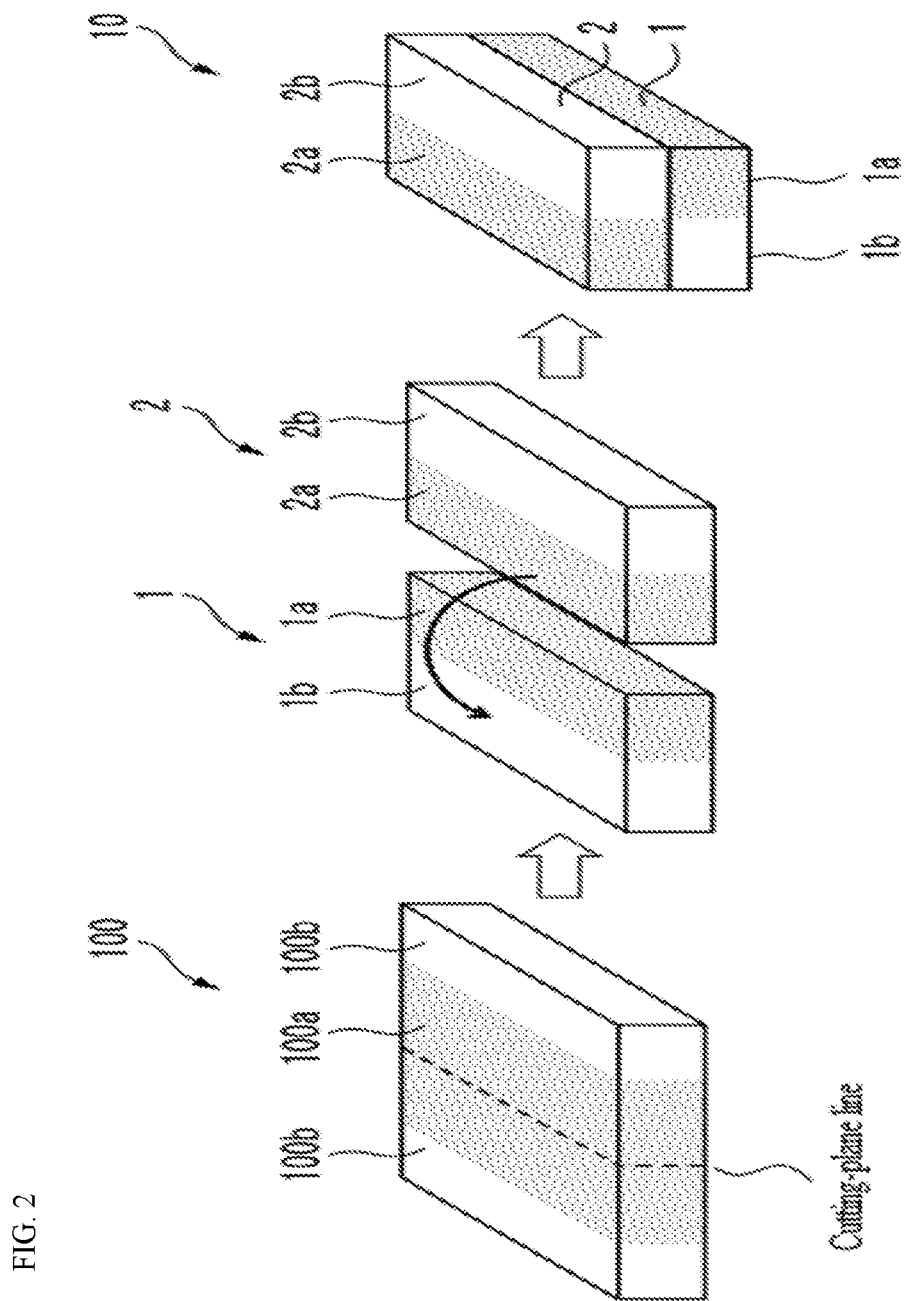
FIG. 2 shows one aspect in the case of producing the mineral fiber laminate of the present invention using mineral fiber mats having a constant thickness but a distribution of area density.

For example, as shown in FIG. 2, after cutting a high area density portion (100a) of the mineral fiber mat web (100) having the high area density portion (100a) in a band-shaped region in the center of the mat and low area density portions (100b) on both sides of the central band-shaped region, the first mineral fiber mat (1) having a high area density portion (1a) and a low area density portion (1b), and a second mineral fiber mat (2) having a high area density portion (2a) and a low area density portion (2b), can be laminated so that the low area density portion (2b) and the high area density portion (2a) of the second mineral fiber mat (2) are respectively superimposed on the high area density portion (1a) and the low area density portion (1b) of the first mineral fiber mat (1).

In the aforementioned first and second embodiments, the step of measuring area density distribution is not required to be carried out each time the first mineral fiber mat (1) and second mineral fiber mat (2) are laminated, but rather these embodiments include embodiments in which, for example, by measuring area density distribution of a continuously produced mineral fiber mat at fixed intervals, subsequent measurement of area density distribution is not required to be carried out.

In a method for producing a mineral fiber laminate of a third embodiment of the present invention, the aforementioned step of preparing a first mineral fiber mat and/or step of preparing a second mineral fiber mat comprise(s): forming a mineral fiber mat web by imparting a high area density portion and a low area density portion, and imparting a first mineral fiber having a high area density portion and a low area density portion and imparting a second mineral fiber mat having a high area density portion and low area density portion by cutting the mineral fiber mat web.

In this method, although mineral fiber mats were conventionally formed so as to have uniform thickness, deliberately making thickness non-uniform facilitates the generation of a distribution of area density in the mineral fiber mat. In this method, since it is not necessary to make thickness uniform when forming a mineral fiber mat, mineral fiber mats can be formed easily extremely easily. In addition, in this case, the area density distribution may not be measured.

Figure 3:
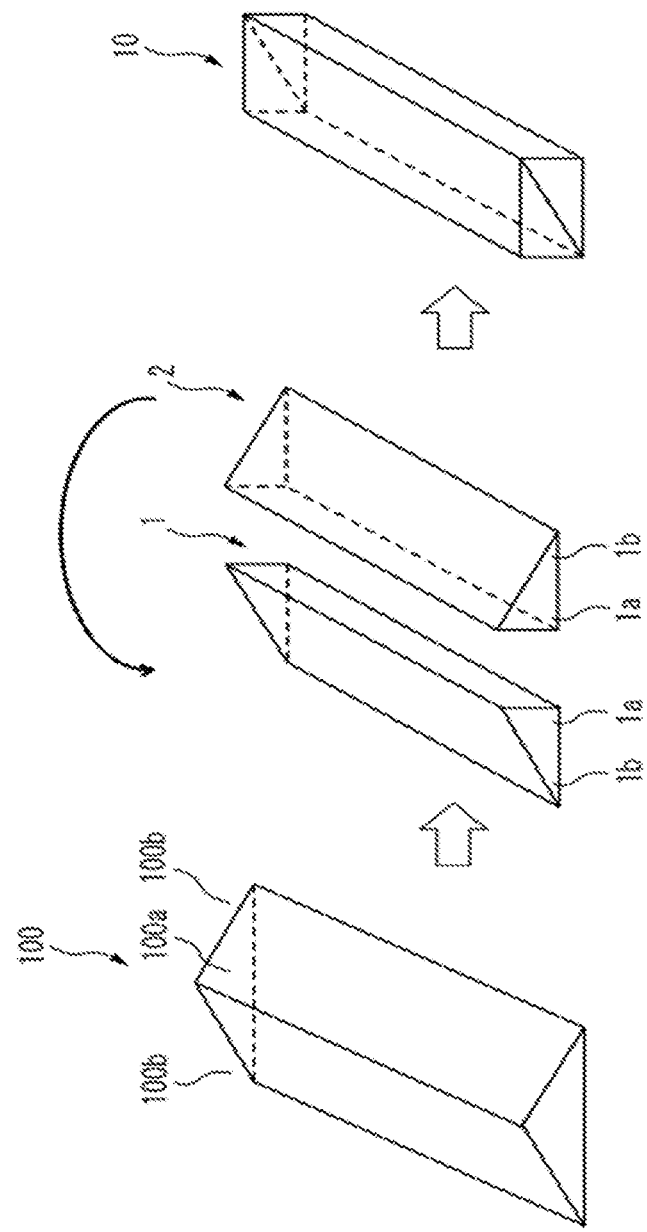
FIG. 3 shows one aspect in the case of producing the mineral fiber laminate of the present invention using mineral fiber mats not having a constant thickness and having a distribution of area density.

For example, as shown in FIG. 3, by forming a mineral fiber mat web (100) by imparting a high area density portion (100a) in a band-shaped region in the center of the mat and imparting a low area density portion (100b) on both sides of the central band-shaped region, and then cutting at roughly the center of the high area density portion (100a), a first mineral fiber mat (1) having a high area density portion (1a) and a low area density portion (1b), and a second mineral fiber mat (2) having a high area density portion (2a) and a low area density portion (2b) may be obtained. Then, the mats can be laminated such that the low area density portion (2b) and the high area density portion (2a) of the second mineral fiber mat (2) are superimposed on the high area density portion (1a) and the low area density portion (1b) of the first mineral fiber mat (1).

With respect to all of the methods for producing a mineral fiber laminate of the aforementioned first to third embodiments, a drying step and hot press step may be carried out after carrying out the aforementioned steps, may be carried out prior to the aforementioned steps, or may be carried out during any of the aforementioned steps.

With respect to the methods for producing a mineral fiber laminate of the aforementioned second and third embodiments, the step of cutting a mineral fiber mat web and/or the step of laminating the first mineral fiber mat and the second mineral fiber mat may be carried out by a line production system.

Figure 4A:
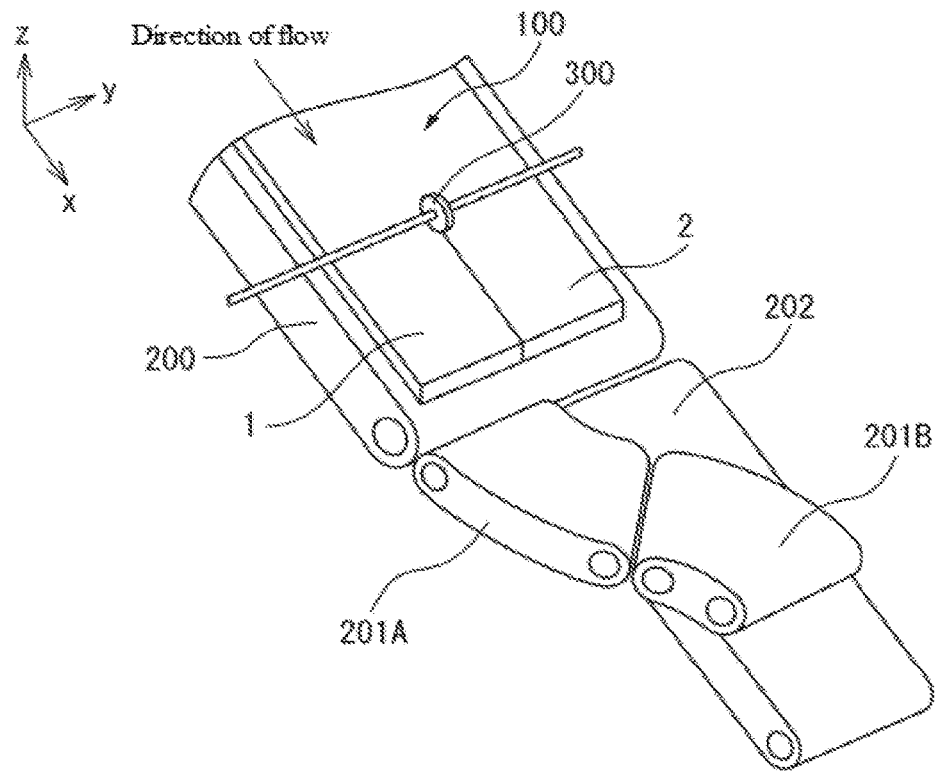
FIG. 4A uses a perspective view to show one aspect of a method for producing the mineral fiber laminate of the present invention as shown in FIG. 2 using a line production system.
Figure 4B:
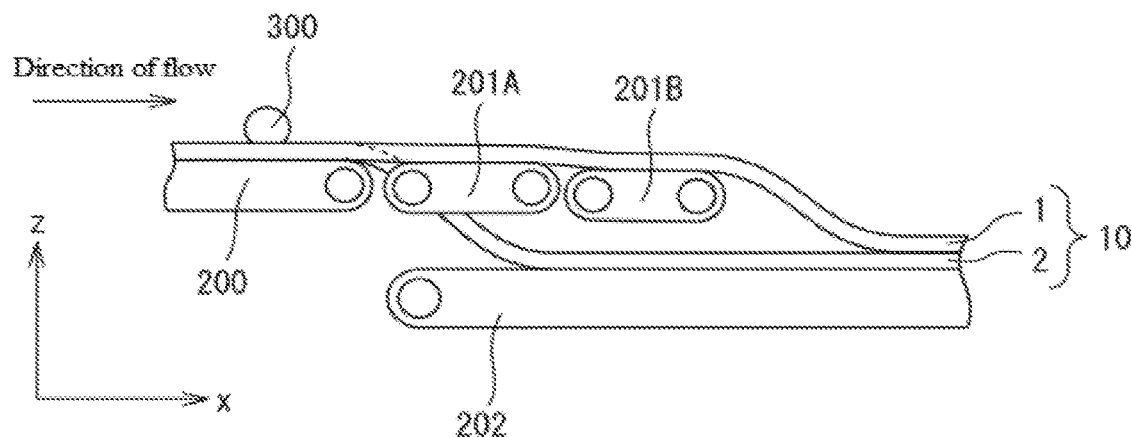
FIG. 4B uses a side view to show one aspect of a method for producing the mineral fiber laminate of the present invention as shown in FIG. 2 using a line production system.

For example, FIGS. 4A and 4B show one aspect of a method for producing the mineral fiber laminate of the present invention as shown in FIG. 2 using a line production system.

FIG. 4A uses a perspective view to show the step of cutting the mineral fiber mat web (100). In FIG. 4A, a slitter (300) is present between a first conveyor (201) and a second conveyor (202). The mineral fiber mat web (100) is cut into the first mineral fiber mat (1) and the second mineral fiber mat (2) by the slitter (300) which are then respectively transported by the first conveyor (201) and the second conveyor (202) in the flow direction thereof. Here, the first mineral fiber mat (1) is transported by two curved conveyors (201A, 201B), and the second mineral fiber mat (2) is transported by a linear conveyor (202A).

Furthermore, the flow direction of the conveyor corresponds to the direction along the length of the mineral fiber mats, while the transverse direction of the conveyor corresponds to the direction across the width of the mineral fiber mats.

FIG. 4B shows a side view of the step of obtaining the mineral fiber laminate (10) by laminating the first mineral fiber mat (1) and the second mineral fiber mat (2). The first mineral fiber mat (1) transported by the two curved conveyors (201A, 201B) moves over the second mineral fiber mat (2) transported by the linear conveyor (202A). The mineral fiber laminate (10) is then obtained by laminating the first mineral fiber mat (1) on the second mineral fiber mat (2) at the end of the conveyor.

With respect to the methods for producing a mineral fiber laminate of the aforementioned second and third embodiments, the mineral fiber mat web may be cut into three or more mineral fiber mats, such as four or six mineral fiber mats. Namely, with respect to the methods for producing a mineral fiber laminate of the aforementioned second and third embodiments, a high area density portion and a low area density portion of a first mineral fiber mat can be separated by cutting a first mineral fiber mat having a high area density portion and a low area density portion, and/or a high area density portion and a low area density portion of a second mineral fiber mat can be separated by cutting a second mineral fiber mat having a high area density portion and a low area density portion. Here, the step of separating a high area density portion and a low area density portion from a first mineral fiber mat and/or second mineral fiber mat may be carried out simultaneously to a step of cutting a first mineral fiber mat and a second mineral fiber mat having a high area density portion and a low area density portion from a mineral fiber mat web.

Preferably, a high area density portion and a low area density portion are separated by cutting a second mineral fiber mat, and the separated high area density portion and low area density portion are respectively laminated on a low area density portion and high area density portion of a first mineral fiber mat to make the area density of the resulting laminate uniform.

Figure 5A:
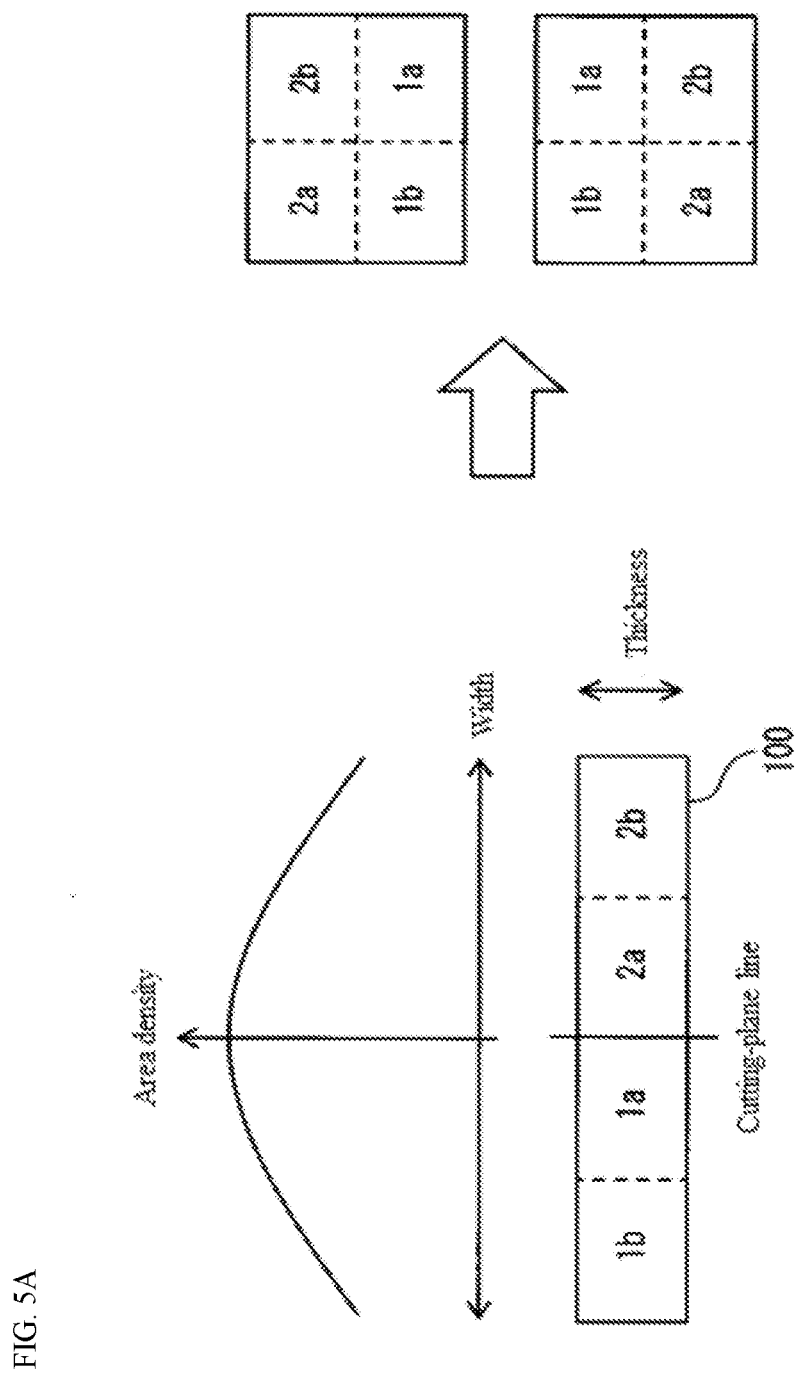
FIG. 5A shows one example of a mineral fiber mat having a distribution of area density.

As shown in FIG. 5A, in a case where a mineral fiber mat web (100) has high area density in a central portion in the direction across the width and has low area density on the ends in the direction across the width, the mineral fiber mat web (100) can be separated into a first mineral fiber mat (1) having a low area density portion (1b) and a high area density portion (1a), and a second mineral fiber mat (2) having a low area density portion (2b) and a high area density portion (2a) by cutting in the center thereof, and these can be laminated to make the area density of the laminate uniform.

In addition, depending on the case, the mineral fiber mat web (100) may also be cut into four portions, namely the low area density portion (1b) and the high area density portion (1a) of the first mineral fiber mat (1), and the low area density portion (2b) and the high area density portion (2a) of the second mineral fiber mat (2). In this manner, the low area density portion (1b) and the high area density portion (1a) of the first mineral fiber mat (1) and the low area density portion (2b) and the high area density portion (2a) of the second mineral fiber mat (2) can be laminated in the various aspects shown in (a) to (h) of FIG. 5B so that the density distribution thereof decreases.

Figure 6:
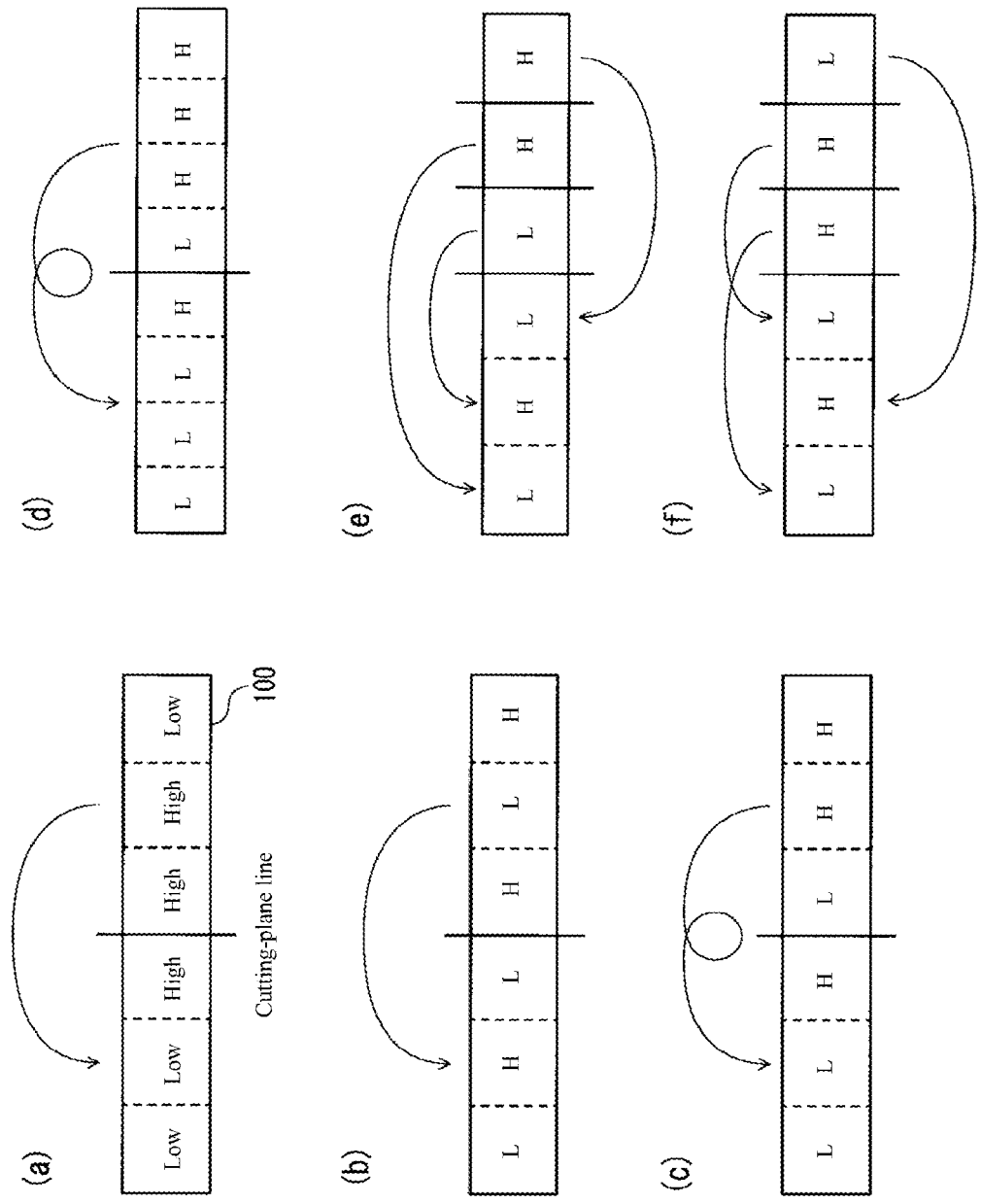
FIG. 6 shows several examples of aspects of cutting and laminating mineral fiber mats having a distribution of area density.

As shown in FIG. 6, in a case where the mineral fiber mat web (100) has various area density distributions, although it is also possible to superimpose by cutting in the center as shown in (a) to (d) of FIG. 6, the mineral fiber mat web (100) can also be cut into a plurality of portions as shown in (e) and (f) to make the area density of the resulting laminate uniform. Furthermore, the symbols "High (H)" and "Low (L)" in FIG. 6 indicate high area density portions and low area density portions.

Figure 5B:
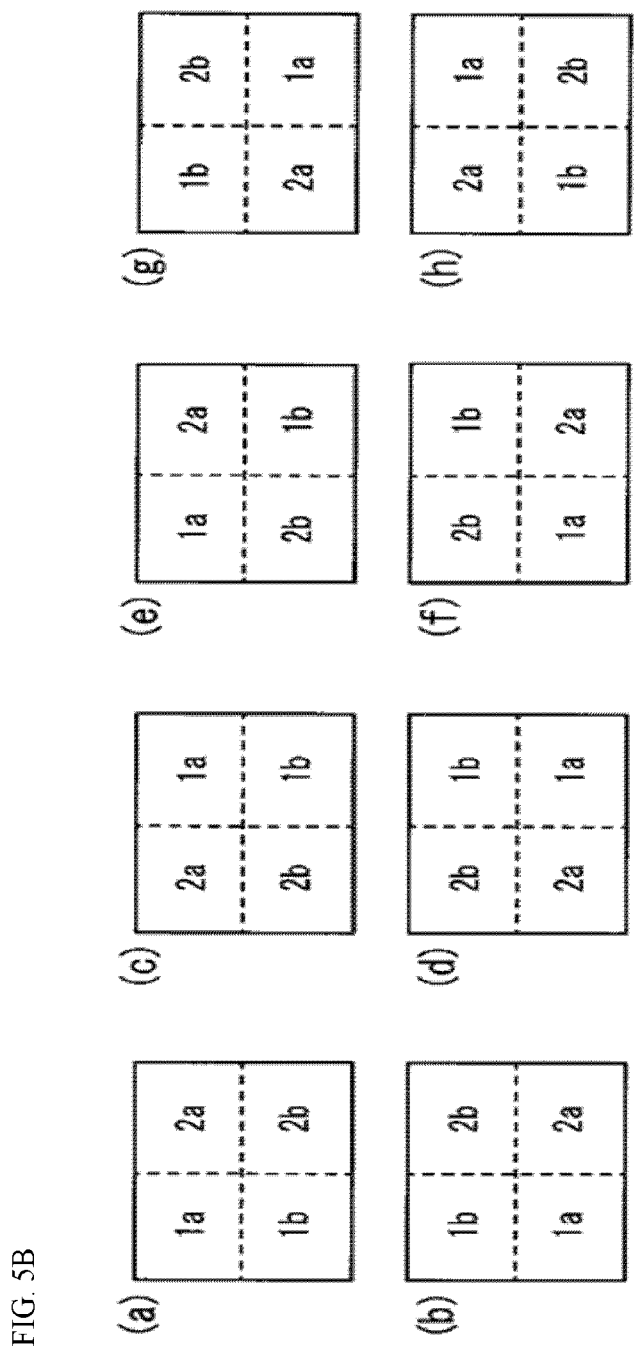
FIG. 5B shows aspects of laminates obtained by cutting the mineral fiber mat of FIG. 5A.

In the aspect considered in FIG. 6, although regions having an area density distribution of the mineral fiber mat web were considered as being divided into 6 or 8 regions, these may also be divided into 4 regions as shown in FIGS. 5A and 5B, or may be divided into more than 8 regions. In addition, an intermediate density portion can naturally also be present in the mineral fiber mat web, and this intermediate density portion, high area density portion, intermediate density portion or low density portion are laminated so as to reduce the area density distribution of the resulting laminate.

EXAMPLES

A mineral fiber mat web having a width of 500 mm was produced using a target value of average area density of 1500 g/m$^2$. When the area density thereof was measured at six locations separated at equal intervals in the direction across the width, the measured area densities were 1383 g/m$^2$, 1452 g/m$^2$, 1509 g/m$^2$, 1682 g/m$^2$, 1483 g/m$^2$ and 1531 g/m$^2$ moving from one side to the other side across the width thereof.

This mineral fiber mat web was cut in the center to obtain a first mineral fiber mat having area density of 1383 g/m$^2$, 1452 g/m$^2$ and 1509 g/m$^2$ moving from one side to the other side across the width thereof, and a second mineral fiber mat having area density of 1682 g/m$^2$, 1483 g/m$^2$ and 1531 g/m$^2$ moving from one side to the other side across the width thereof.

A mineral fiber laminate was then obtained by laminating the first mineral fiber mat and the second mineral fiber mat so that the portion of the first mineral fiber mat having an area density of 1383 g/m$^2$ was superimposed on the portion of the second mineral fiber mat having an area density of 1682 g/m$^2$, and the portion of the first mineral fiber mat having an area density of 1509 g/m$^2$ was superimposed on the portion of the second mineral fiber mat having an area density of 1531 g/m$^2$.

A mineral fiber laminate obtained in this manner has a substantially small area density distribution, and is able to impart a thermal insulation material that has in-plane uniformity, particularly in the case of using in a core material of a vacuum thermal insulation material.

BRIEF DESCRIPTION OF THE REFERENCE SYMBOLS

1 First mineral fiber mat
1a High area density portion of first mineral fiber mat
1b Low area density portion of first mineral fiber mat
2 Second mineral fiber mat
2a High area density portion of second mineral fiber mat
2b Low area density portion of second mineral fiber mat
10 Mineral fiber laminate
100 Mineral fiber mat web
100a High area density portion of mineral fiber mat web
100b Low area density portion of mineral fiber mat web

The invention claimed is:

1. A mineral fiber laminate, comprising:
a first mineral fiber mat having a first high area density portion and a first low area density portion; and
a second mineral fiber mat having a second high area density portion and a second low area density portion,
wherein the first high area density portion and/or the second high area density portion is at least partially laminated on the first low area density portion, and
wherein the first high area density portion and/or the second high area density portion is at least partially laminated on the second low area density portion.

2. The laminate of claim 1, wherein the first high area density portion and the first low area density portion form mutually adjacent band-shaped regions across the length thereof, and
wherein the second high area density portion and the second low area density portion form mutually adjacent band-shaped regions across the length thereof.

3. The laminate of claim 2, wherein in the first mineral fiber mat, the first high area density portion is a central band-shaped region across the width thereof, and the first low area density portions are band-shaped regions adjacent to both sides of the central band-shaped region, and
wherein in the second mineral fiber mat, the second low area density portion is a central band-shaped region across the width thereof, and the second high area density portions are band-shaped regions adjacent to both sides of the central band-shaped region.

4. The laminate of claim 1, wherein the first high area density portion and the first low area density portion are separated from each other, and/or
wherein the second high area density portion and the second low area density portion are separated from each other.

5. A vacuum thermal insulation material, comprising:
the laminate of claim 1; and
an envelope in which the mineral fiber laminate is sealed therein.

6. The laminate of claim 1, wherein the first and/or second high area density portion has an area density that is 1% or more higher than an entire average area density of the first and/or second mineral fiber mat.

7. The laminate of claim 1, wherein the first and/or second high area density portion has an area density that is 3% or more higher than an entire average area density of the first and/or second mineral fiber mat.

8. The laminate of claim 1, wherein the first and/or second high area density portion has an area density that is 5% or more higher than an entire average area density of the first and/or second mineral fiber mat.

9. The laminate of claim 1, wherein the first and/or second high area density portion has an area density that is 10% or more higher than an entire average area density of the first and/or second mineral fiber mat.

10. The laminate of claim 1, wherein the first and/or second low area density portion has an area density that is 1% or more lower than an entire average area density of the first and/or second mineral fiber mat.

11. The laminate of claim 1, wherein the first and/or second low area density portion has an area density that is 3% or more lower than an entire average area density of the first and/or second mineral fiber mat.

12. The laminate of claim 1, wherein the first and/or second low area density portion has an area density that is 5% or more lower than an entire average area density of the first and/or second mineral fiber mat.

13. The laminate of claim 1, wherein the first and/or second low area density portion has an area density that is 10% or more lower than an entire average area density of the first and/or second mineral fiber mat.

14. The laminate of claim 1, having an average area density of 1000 g/m$^2$ or more.

15. The laminate of claim 1, having a density of 50 kg/m$^3$ or more.

16. A method for producing a mineral fiber laminate, the method comprising:
   preparing a first mineral fiber mat having a first high area density portion and a first low area density portion;
   preparing a second mineral fiber mat having a second high area density portion and a second low area density portion; and
   laminating the first high area density portion and/or the second high area density portion on the first low area density portion; and
   laminating the first high area density portion and/or the second high area density portion on the second low area density portion, to obtain a mineral fiber laminate.

17. The method of claim 16, wherein the preparing of the first and/or the second mineral fiber mat comprises measuring an area density distribution of the mineral fiber mats.

18. The method of claim 16, wherein the preparing of the first and/or the second mineral fiber mat comprises:
   measuring an area density distribution of the mineral fiber mat web; and
   obtaining the first and/or the second mineral fiber mat by cutting the mineral fiber mat web.

19. The method of claim 16, wherein the preparing the first and/or the second mineral fiber mat comprises:
   forming a mineral fiber mat web by imparting a high area density portion and a low area density portion; and
   imparting a first mineral fiber having a high area density portion and a low area density portion and imparting a second mineral fiber mat having a high area density portion and low area density portion by cutting the mineral fiber mat web.

20. The method of claim 18, further comprising:
   separating the first high area density portion and the first low area density portion by cutting the first mineral fiber mat; and
   separating the second high area density portion and the second low area density portion by cutting the second mineral fiber mat.

* * * * *